(12) United States Patent
Watanabe

(10) Patent No.: US 9,103,985 B2
(45) Date of Patent: Aug. 11, 2015

(54) OPTICAL WAVEGUIDE DEVICE AND A MANUFACTURING METHOD FOR AN OPTICAL WAVEGUIDE DEVICE

(75) Inventor: Shinya Watanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/991,298

(22) PCT Filed: Dec. 21, 2011

(86) PCT No.: PCT/JP2011/080545
§ 371 (c)(1),
(2), (4) Date: Jun. 3, 2013

(87) PCT Pub. No.: WO2012/086846
PCT Pub. Date: Jun. 28, 2012

(65) Prior Publication Data
US 2013/0279847 A1 Oct. 24, 2013

(30) Foreign Application Priority Data
Dec. 21, 2010 (JP) .................................. 2010-284281

(51) Int. Cl.
*G02B 6/28* (2006.01)
*G02B 6/293* (2006.01)
(Continued)

(52) U.S. Cl.
CPC .............. *G02B 6/2821* (2013.01); *G02B 6/125* (2013.01); *G02B 6/2938* (2013.01);
(Continued)

(58) Field of Classification Search
CPC .... H04Q 11/0001; G02B 6/284; G02B 6/356; G02B 6/2938; G02B 6/29395; G02B 6/29383

USPC .......................................................... 385/24
See application file for complete search history.

(56) References Cited

U.S. PATENT DOCUMENTS 4,787,693 A * 11/1988 Kogelnik et al. ............... 385/46
7,197,201 B2  3/2007 Nakaya et al.
(Continued)

FOREIGN PATENT DOCUMENTS

| CN | 1467517 | 1/2004 |
|---|---|---|
| JP | 2012-518202 | 8/2012 |
| WO | 2010-095018 | 8/2010 |

OTHER PUBLICATIONS

International Search Report in International Application No. PCT/JP2011/080545 mailed May 15, 2012 from WIPO, with English translation.
Yohei Sakamaki, "Reduction of wavelength dependent phase error in silica-based 90° optical hybrid", Proceedings of the 2010 IEICE General Conference Electronics 1, Mar. 17, 2010, (received date), 223~223 (from International Search Report).
(Continued)

*Primary Examiner* — Jerry Blevins
(74) *Attorney, Agent, or Firm* — Young & Thompson

(57) ABSTRACT

To reduce the wavelength dependence of the phase difference given to the lightwaves traveling through the optical waveguide arms of a coherent mixer, the optical waveguide device includes a first optical branching device branching a first input light and outputting to a first and a second optical waveguides, a second optical branching device branching a second input light and outputting to a third and a fourth optical waveguides, a first optical coupler that mixes lightwaves travelling through the first and the third optical waveguides, and then branches and outputs a first and a second output lights, a second optical coupler that mixes the lightwaves which travel through the second and the fourth optical waveguides, and then branches and outputs a third and a fourth output lights. Here optical path lengths are mutually equal between the first and the second optical waveguides, and between the third and the fourth optical waveguides.

4 Claims, 9 Drawing Sheets

(51) Int. Cl.
G02B 6/125 (2006.01)
G02B 6/126 (2006.01)
G02B 6/12 (2006.01)

(52) U.S. Cl.
CPC ....... *G02B 6/29383* (2013.01); *G02B 6/29395* (2013.01); *G02B 6/126* (2013.01); *G02B 6/2813* (2013.01); *G02B 2006/12061* (2013.01); *G02B 2006/12159* (2013.01); *Y10T 29/49826* (2015.01)

(56) References Cited

U.S. PATENT DOCUMENTS

| | | |
|---|---|---|
| 2003/0138189 A1* | 7/2003 | Rockwell et al. ............... 385/15 |
| 2009/0041462 A1* | 2/2009 | Costa et al. .................... 398/79 |
| 2010/0245831 A1 | 9/2010 | Okamoto |
| 2012/0106984 A1 | 5/2012 | Jones |

OTHER PUBLICATIONS

Takayuki Mizuno, "Silica-Based PLC-Type Dual Polarization Optical Hybrid", 2010 Nen Proceedings of the Electronics Society Conference of IEICE 1, Sep. 17, 2010, (received date), 173~173 (from International Search Report).

Toshikazu Hashimoto et al., "Dual polarization optical hybrid module using planar lightwave circuit", Proceedings of the 2009 the Institute of Electronics, Information and Communication Engineers (IEICE) Electronic Society Conference, Sep. 15, 2009, p. 194 (from p. 3, line 17 of the specification).

Japanese Office Action dated Jul. 15, 2014 in corresponding Japanese Patent application No. 2012-549914, with partial English translation.
Chinese Office Action, dated Feb. 2, 2015, in corresponding Chinese Patent Application No. 201180061849.4.

* cited by examiner

OPTICAL WAVEGUIDE DEVICE AND A MANUFACTURING METHOD FOR AN OPTICAL WAVEGUIDE DEVICE

TECHNICAL FIELD

The present invention relates to an optical waveguide device and relates to an optical waveguide device equipped with a phase delay function in particular.

BACKGROUND ART

In recent years, in super high-speed communication beyond 100 Gbit/second, a communication technology by polarized wave orthogonal multiplexing multiple value digital signal modulation method (DP-QPSK: Dual Polarization Differential Quadrature Phase Shift Keying) excelling in wavelength utilization efficiency, reception characteristics and dispersion compensation ability is noted. For a receiver in DP-QPSK system, the function of polarized wave separation of an optical signal into a TE (Transverse Electric) optical signal and a TM (Transverse Magnetic) optical signal, and the function of 90 degree optical hybrid for extracting the phase information out of these optical signals which have been performed with the polarized wave separation are necessary. This phase information is the four value phase information on an I-Q plane, composed of Ip and In which have $\pi$ phase difference each other, and also Qp and Qn which have $\pi/2$ phase delay to Ip and In respectively.

A planar optical wave circuit using optical waveguide technology is considered superior for a device which realizes the receiver function of such DP-QPSK system, and its development is advanced in recent years. The optical waveguide technology is the technology which sets up an optical waveguide with the various shapes on a substrate by the same fine processing technology as a semiconductor integrated circuit manufacturing process, and is suitable for integration and mass production.

For example, as an optical waveguide device integrating the polarized wave separation function mentioned above and the 90 degree optical hybrid function into a planar optical circuit, an optical wave circuit structure shown in FIG. 8 is disclosed in non-patent literature 1. FIG. 9 indicates the composition of a planar optical circuit of the TE optical signal side out of the part which performs the 90 degree optical hybrid function, as a schematic diagram.

The optical wave circuit shown in FIG. 9 composes an interferometer which is generally called a coherent mixer. In FIG. 9, the inputted TE optical signal and local oscillator light are branched by optical branching devices 10 and 11, respectively. A Y branch structure type optical branch device which is the most basic optical branching device is usually employed as the optical branching devices 10 and 11. The reason is that Y branch structure type optical branching devices basically have no wavelength dependence on the optical branching ratio and are relatively tolerant of the disturbance on manufacturing because of employing the simple symmetrical structure in which the inputted light is split from one waveguide into two branches and outputted. The optical waveguide arms 12-15 compose an interferometer, and the arms 12-14 are the same in the optical path length while the optical path length of the arm 15 is longer than other arms by equivalent of ¼ of the wavelength of optical wave propagating in the optical waveguide, so that the 90 degree phase difference is given. That is, the relation between the optical path length difference dL of two arms and the phase difference d $\phi$ of the lights traveling through those arms is expressed by the formula (1), wherein the wavelength is $\lambda$ and the effective refractive index of the optical waveguide is n.

$$d\phi = 2\pi \cdot n \cdot dL / \lambda \quad (1)$$

According to the formula (1), the optical path length difference dL corresponding to the 90 degree ($\pi/2$ radian) phase difference is represented by the formula (2).

$$dL = \lambda/4n \quad (2)$$

Accordingly, by setting up the optical path length difference to the optical waveguide arms as mentioned above, the four-value-phase-information on the I-Q plane is outputted from the optical couplers 16 and 17, and the above-mentioned 90 degree optical hybrid function is realized.

CITATION LIST

Non Patent Literature

[NPL 1] Toshikazu Hashimoto, and seven others, "Dual polarization optical hybrid module using planar lightwave circuit", Proceedings of the 2009 the Institute of Electronics, Information and Communication Engineers (IEICE) Electronic Society Conference, 2009 Sep. 15, p. 194

SUMMARY OF INVENTION

Technical Problem

However, by the structure as shown in FIG. 9, even if the optical path length difference corresponding to the 90 degrees phase difference for a certain wavelength light is set up between the arms, the phase difference does not become 90 degrees when the wavelength of the optical signal is different. However, in actual, the various wavelengths belonging to an optical wavelength line for wavelength multiplexing specified by ITU-T (International Telecommunication Union), i.e., the ITU-T grid, are used for wavelength multiplex transmission systems. For example, the wavelength bandwidth called C band is approximately 1530-1565 nm and L band is approximately 1580-1610 nm, and in the case of designing a coherent mixer for C band, usually the geometrical length of the waveguide is adjusted based on the wavelength of 1550 nm as the band center. That is, the optical path length difference dL for this case is dL=1.55/(4×1.465)≈0.265µm according to the formula (2), wherein the effective refractive index n=1.465, and the arm 15 is to be longer than other arms by this optical path length difference. However, with this design, the phase difference is approximately 91.17 degrees for the light of the shortest wavelength 1530 nm of C bands and is approximately 89.14 degrees for the longest wavelength. That is, in the bandwidth of C band, the phase difference of the traveling optical wave through arms 14 and 15 have the width of approximately ±1 degree to 90 degrees depending on the wavelength. Further, in the case of using whole bandwidth of C band and L band, the phase difference have the width of approximately ±2.3 degrees to 90 degrees depending on the wavelength. In general, the allowance range of the phase difference required in the demodulation of a phase modulation signal is to be within ±5 degree to 90 degrees, and the above-mentioned wavelength dependence is the amount settled within the allowance range by alone. However, when the fluctuations of the phase difference which is caused by some other factors are piled up, the above-mentioned wavelength dependence may be an important factor which causes the danger of exceeding the allowance range.

An object of the present invention is to settle the problem mentioned above, and is to provide an optical waveguide device and a manufacturing method of the optical waveguide device, which can reduce the wavelength dependence of the phase difference given to the lightwaves traveling through the optical waveguide arms which constitutes a coherent mixer.

Solution to Problem

The optical waveguide device of this invention includes a first optical branching device that branches a first input light and outputs to a first and a second optical waveguides, a second optical branching device that branches a second input light and outputs to a third and a fourth optical waveguides, a first optical coupler that mixes lightwaves which travel through the first and the third optical waveguides, and then branches and outputs a first and a second output lights, a second optical coupler that mixes the lightwaves which travel through the second and the fourth optical waveguides, and then branches and outputs a third and a fourth output lights. Here optical path lengths are mutually equal between the first and the second optical waveguides, and between the third and the fourth optical waveguides. And the first optical branching device has the structure in which an optical input from the position that overlaps with the optical propagation center of the device is performed. Further the second optical branching device includes a 3 dB multimode interferometer splitter equipped with the structure that the optical input from the position of the edge side rather than the optical propagation center of the device is performed.

The manufacturing method of an optical waveguide device of this invention includes a step of forming a first clad layer on a substrate, a step of stacking a core layer on the first clad layer, a step of forming a core by patterning the core layer, and a step of covering the core with a second clad layer which has the same refractive indexes as the first clad layer. Here patterning of the core layer is performed by using a mask pattern includes the first optical branching device that branches a first input light and outputs to a first and a second optical waveguides, a second optical branching device that branches a second input light and outputs to a third and a fourth optical waveguides, a first optical coupler that mixes lightwaves which travel through the first and the third optical waveguides, and then branches and outputs a first and a second output lights, a second optical coupler that mixes the lightwaves which travel through the second and the fourth optical waveguides, and then branches and outputs a third and a fourth output lights. Here the optical path lengths are mutually equal between the pair of the first and second optical waveguides, and between the pair of the third and the fourth optical waveguides, respectively. And either one of the first and the second optical branching devices has a 1 input and 2 outputs symmetrical branch structure type optical branching device and the other one has a 2 inputs and 2 outputs 3 dB multimode interferometer splitter.

Advantageous Effects of Invention

According to the present invention, an optical waveguide device and a manufacturing method of the optical waveguide device, can be provided, which can reduce the wavelength dependence of the phase difference given to the lightwaves traveling through the optical waveguide arms which constitutes a coherent mixer.

DESCRIPTION OF EMBODIMENTS

In the following, embodiments of the present invention are described with reference to drawings.

First Embodiment

Figure 1:
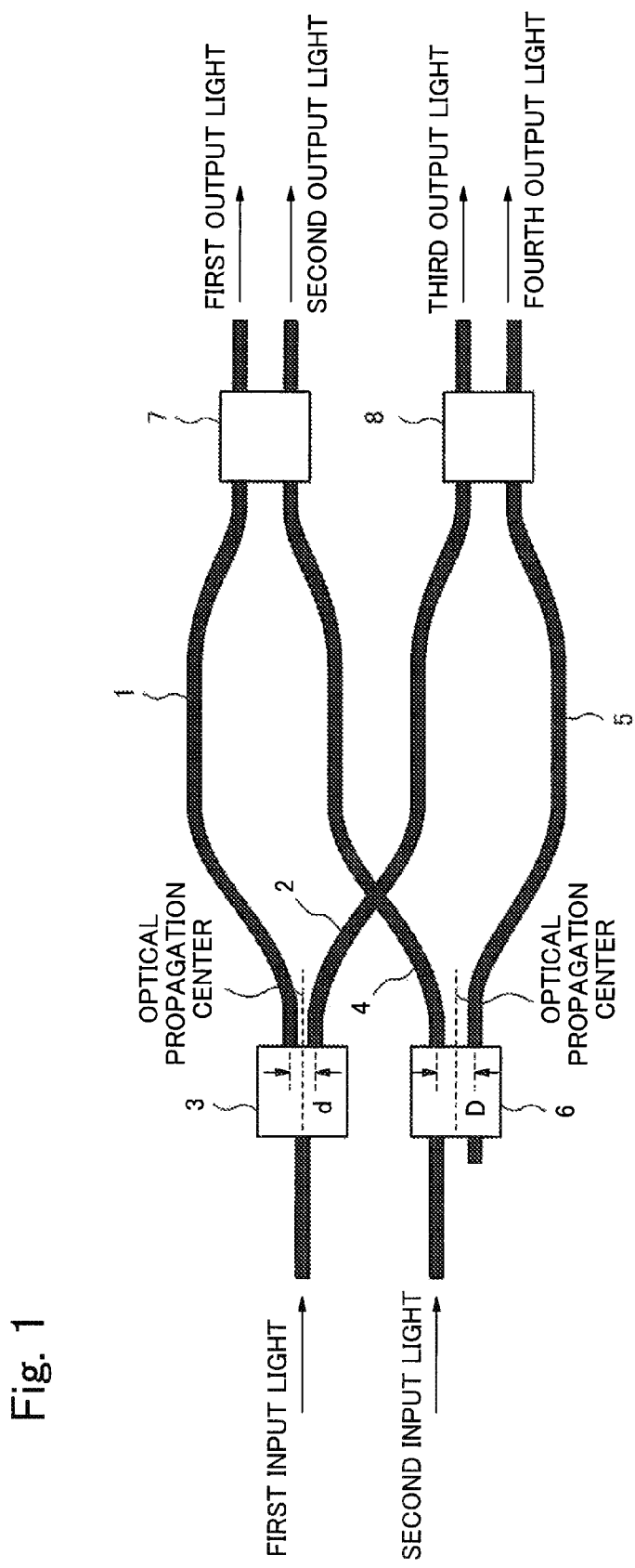
[FIG. 1] is a schematic diagram which shows a structure of an optical waveguide device of a first embodiment of the present invention.

FIG. 1 is a schematic diagram which shows a structure of an optical waveguide device of a first embodiment of the present invention. An optical waveguide device of FIG. 1 has an optical branch device 3 which branches the first input light and outputs it to optical waveguides 1 and 2, and an optical branch device 6 which branches the second input light and outputs it to optical waveguides 4 and 5. And an optical waveguide device of FIG. 1 has an optical coupler 7 which mixes the lightwaves traveling through the optical waveguides 1 and 4, and then splits the mixed lightwave for outputting the first and the second output lights, and an optical coupler 8 which mixes the lightwaves transmitting through the optical waveguides 2 and 5, and then splits the mixed lightwave for outputting the third and the fourth output lights.

Each of the pair of optical waveguides 1 and 2 and the pair of optical waveguides 4 and 5, is equal in optical path length. An optical branching device 3 employs an optical branch device having the structure inputting light from the position that overlaps with the optical propagation center of the device, and an optical branching device 6 employs a 3 dB multimode interferometer splitter having the structure inputting light from the edge side position out of the optical propagation center of the device as an optical branching device.

Herein, the optical propagation center of the optical branching device is a straight line through the center of the optical input side end face of the optical branching device and the center of the optical output side end face, which is indicated by a dotted line in FIG. 1. And the position of the edge side out of the optical propagation center of the optical branching device is, as shown in FIG. 1, the position on the face where the optical waveguide device is constructed, which is closer to the side face of the optical branching device than the optical propagation center of the optical branching device.

Figure 2:
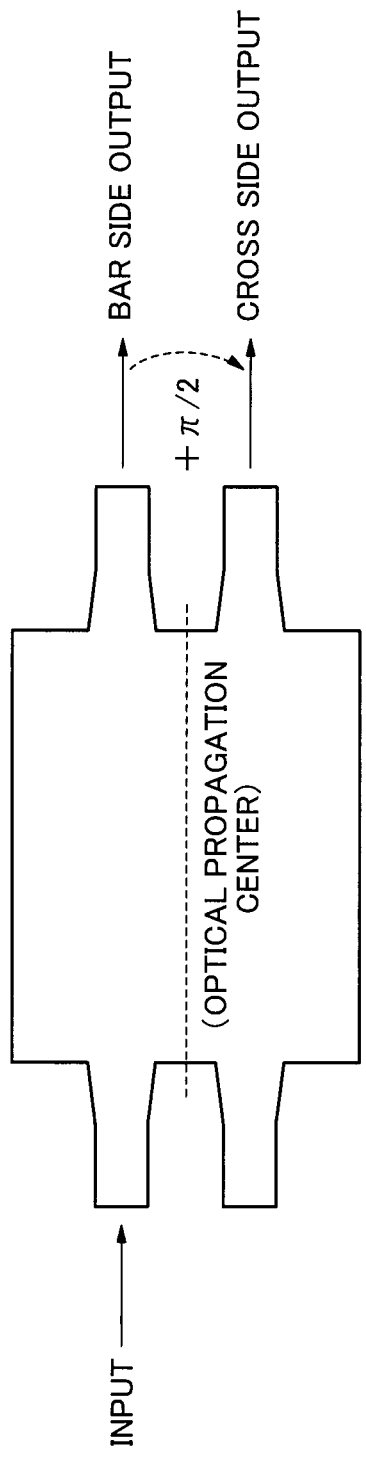
[FIG. 2] is a schematic diagram which shows a structure of a 3 dB multimode interferometer splitter with 2 inputs and 2 outputs used for an optical waveguide device of a first embodiment of the present invention.

In FIG. 1, an example, using a symmetrical branch structure type optical branching device with 1 input and 2 outputs for an optical branch device 3, and using a 3 dB multimode interferometer splitter with 2 inputs and 2 outputs as an optical branching device for an optical branching device 6 which inputs light only from one input portion, is shown. In this case, the light intensity and the phase are identical each other between the lights branched at the optical branching device 3, but, although the light intensity is identical each other between the lights branched at the optical branch device 6, the phase difference of $\pi/2$ is inevitably produced by the interferential effect inside the multimode interferometer. In FIG. 2, the state of the optical output on the Cross side generating the phase difference of $\pi/2$ to the optical output on the Bar side in the 2 inputs and 2 outputs 3 dB multimode interferometer splitter is shown. Thus, by using the 2 inputs and 2 outputs 3 dB multimode interferometer splitter as an optical branching device for an optical branching device 6, the phase difference of $\pi/2$ occurs between the traveling lightwave through an optical waveguide 5 and the traveling lightwave through an optical waveguide 4. Accordingly, when the optical waveguide device of FIG. 1 is employed as a coherent mixer, the optical path length difference is not needed to be set up in order to give the delay of $\pi/2$ to the phase of the lightwave which travels through the optical waveguide 5. Since there is almost no wavelength dependence in the phase difference of $\pi/2$ produced by the interferential effect inside the multimode interferometer, by this structure, different from a structure setting up the optical path length difference between the pair of the optical waveguides so that the phase difference is generated, the problem of fluctuation of phase difference depending on the wavelength can be effectively settled.

Further, because the optical branching device 3 and the optical branching device 6 are different in the structure as mentioned above, the intervals d and D between the exit positions of the branch lights from the respective optical branching devices in FIG. 1 do not become identical. And the multimode interferometer splitter employed as the optical branching device 6, which is different from a Y branch structure type optical branching device for example, has the structure with the tapered waveguide not only in the input side but also in the output side. Accordingly, for example, when the optical waveguides 1, 2, 4 and 5 are composed by combining the same number of the optical waveguide parts with the same curvature, in order to make all optical path lengths of the optical waveguides 1, 2, 4 and 5 equal, the adjustment such as inserting a straight waveguide part to the short optical waveguide is needed.

However, in the constitution of FIG. 1, the optical path lengths of both the optical waveguides 1 and 2 each other, and the optical waveguides 4 and 5 each other, are only needed to be made equal respectively. For this reason, the above-mentioned adjustment is not needed to be performed, and the troubles for designing and manufacturing are reduced substantially.

As mentioned above, by applying the constitution of an optical waveguide device of this embodiment, the wavelength dependence on the phase difference which is given to the traveling lightwave through each optical waveguide arm constituting a coherent mixer can be reduced.

Second Embodiment

Figure 3:
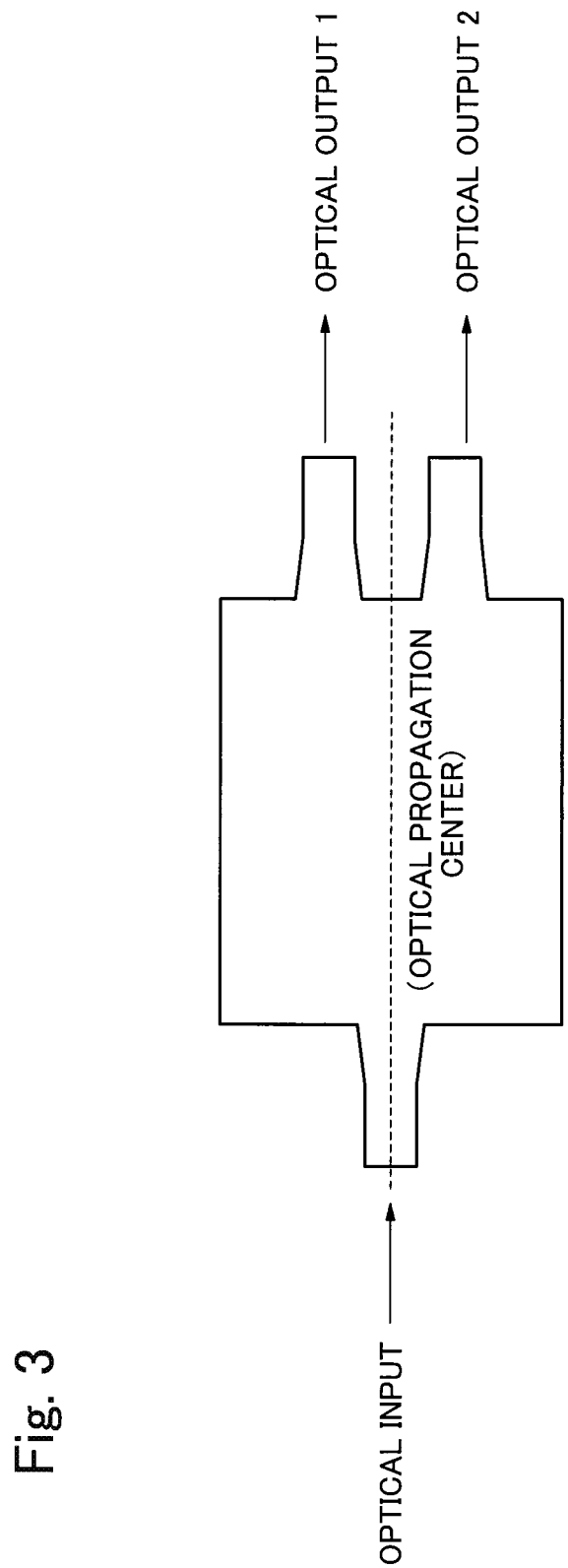
[FIG. 3] is a schematic diagram which shows a structure of a multimode interferometer splitter with 1 input and 2 outputs, to which light is inputted from the position including the center of the optical traveling direction.

Next, a second embodiment of the present invention is described. A second embodiment is employing a Y branch structure type optical branching device as an optical branching device 3 in FIG. 1. As the optical branching device 3, for example, even if a multimode interferometer splitter with 1 input and 2 outputs having one input part which performs the optical input from the position including the center of the optical propagation direction as shown in FIG. 3 is used, it can perform equal optical branching without causing a phase difference. However, Y branch structure type optical branch device has the characteristics, that is, the structure is relatively simple, there is basically no wavelength dependence and it is relatively tolerant to the disturbance in manufacturing.

And as the optical couplers 7 and 8, for example, the Mach-Zehnder interferometers whose characteristics are the same can be used.

Further, both a pair of optical waveguides 1 and 2, and a pair of optical waveguides 4 and 5, are made to be the same in optical path length, and a 3 dB multimode interferometer splitter with 2 inputs and 2 outputs is employed as the optical branching device 6. With this, the $\pi/2$ phase difference is generated in the lightwave which is outputted from the Cross side and travels through the optical waveguide 5, as against the lightwave which is outputted from the Bar side and travels through the optical waveguide 4.

Figure 4:
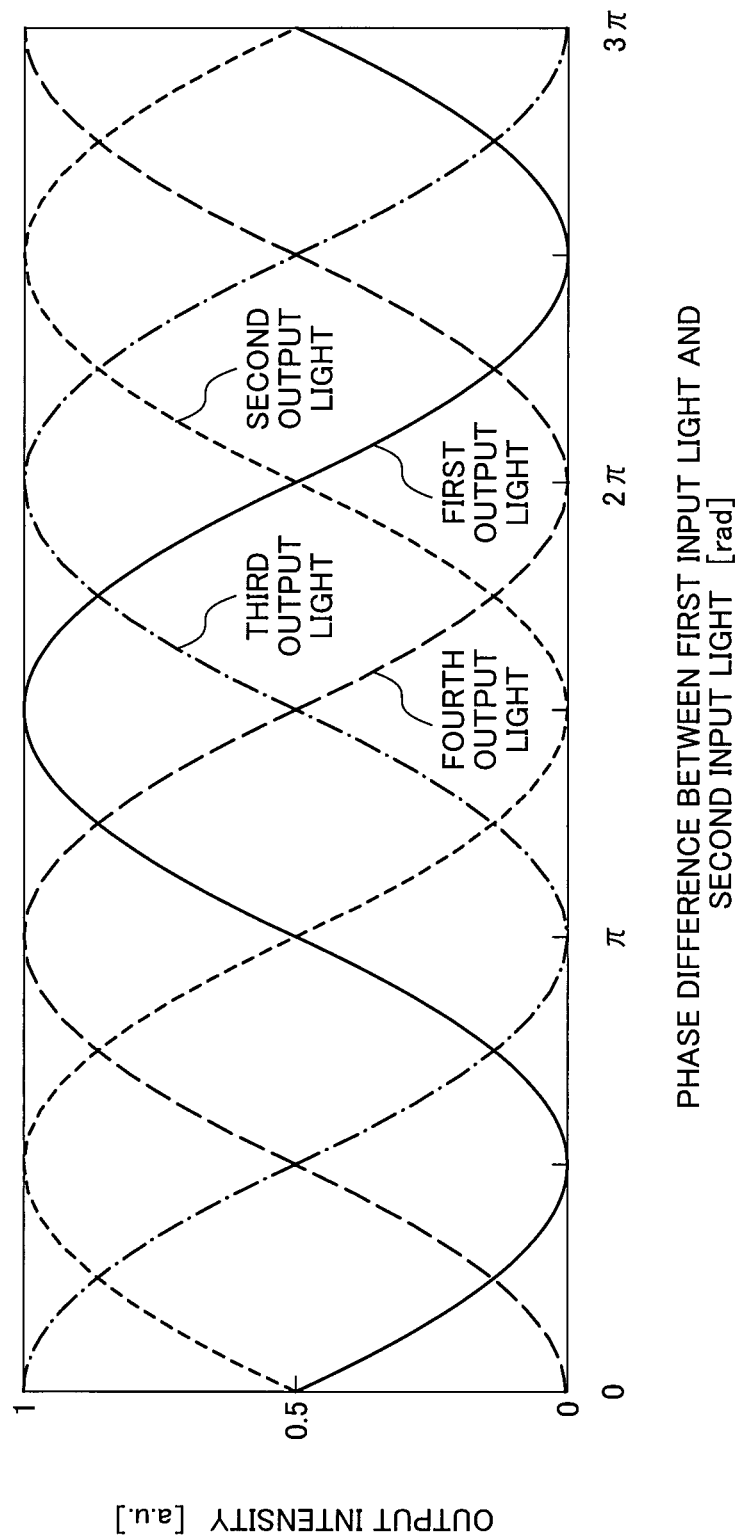
[FIG. 4] is a figure which shows a relation among the output characteristics concerning to the first to the fourth output lights.

In this constitution, when the phase difference of the traveling lightwave through the optical waveguide 1 as against the traveling lightwave through the optical waveguide 4 is changed, the output intensity variation characteristic of the second output light as against the output intensity variation characteristic of the first output light shifts its variation characteristic by only $\pi$ of phase difference. And when the phase difference of the traveling lightwaves through the optical waveguide 2 as against the traveling lightwave through the optical waveguide 5 is changed, the output intensity variation characteristic of the third output light as against the output intensity variation characteristic of the first output light mentioned above shifts its variation characteristic by only $\pi/2$ of phase difference. Further, when the phase difference of the traveling lightwave through the optical waveguide 2 as against the traveling lightwave through the optical waveguide 5 is changed, the output intensity variation characteristic of the fourth output light as against the output intensity variation characteristic of the first output light mentioned above shifts its variation characteristics by only $3\pi/2$ of phase difference. The mutual relations among the output characteristics concerning to the first to the fourth output lights, which are mentioned above, is shown in FIG. 4. In FIG. 4, the horizontal axis indicates the phase difference between the first and the second input lights which are inputted to the optical coupler 7 or 8, while the vertical axis indicates the output intensity of the first to the fourth output lights.

The arrangement of the first to the fourth output lights which have such relation of the output characteristics are consistent with the specification which is settled by OIF (Optical Internetworking Forum) concerning to the order of arrangement of the ports which output the output signals of coherent receivers.

The optical waveguide devices of the constitution mentioned above can be produced in one lump by applying the refined optical technology used for semiconductor integrated circuit manufacturing process.

For example, after forming 10 µm thickness of low refractive index silicon oxide film which becomes lower clad layer on a silicon substrate by chemical vapor deposition method, 4 µm thickness high refractive index silicon oxide film which becomes core layer is stacked. After that, the patterning of this core layer is performed in one lump by photolithography method using photo mask having predetermined shape core patterns which composes the above-mentioned optical branch devices, optical couplers, optical waveguides, and so on. Further, by stacking 10 μm thickness low refractive index silicon oxide film which becomes upper portion clad layer so that the waveguide core mentioned above is covered, predetermined optical waveguides can be constructed. In this case, the refractive index of the silicon oxide film can be adjusted optionally by the dope amount of phosphorus or boron. Here the relative refractive index difference Δn between the upper or the lower clad layer and the core layer is adjusted so as to be 1.3%, for example.

Figure 5:
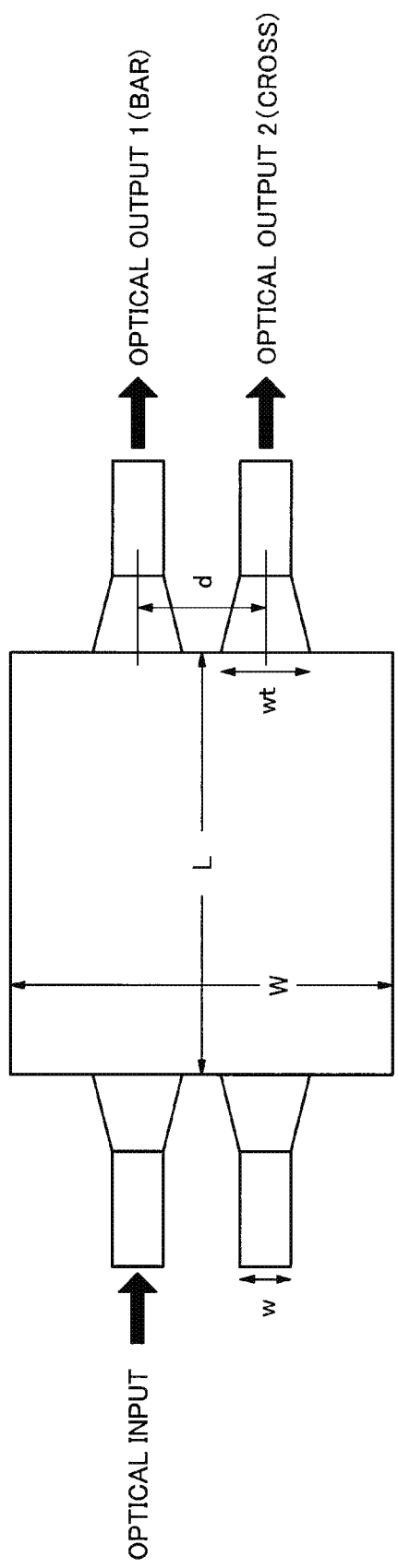
[FIG. 5] is a structural drawing which shows a size in detail of a 3 dB multimode interferometer splitter with 2 inputs and 2 outputs used for an optical waveguide device of a second embodiment of the present invention.
Figure 6:
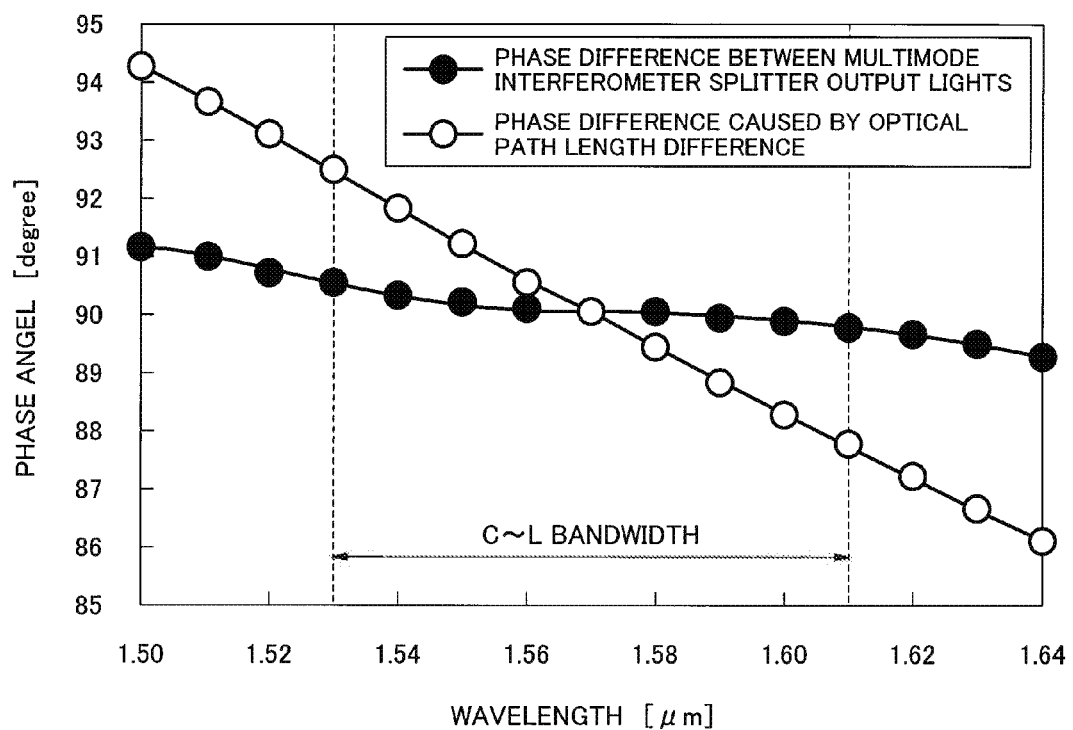
[FIG. 6] is a figure which shows a comparison of the wavelength dependence of the phase difference between a multimode interferometer splitter with 2 inputs and 2 outputs and a construction which causes a phase difference by setting up a specific optical path length difference to a pair of optical waveguides.

FIG. 5 is a structure example of a 2 inputs and 2 outputs 3 dB multimode interferometer splitter component which is used as the optical branching device 6. And FIG. 6 indicates the comparison of the simulation calculation result of the phase difference between the output lights in the multimode interferometer splitter of FIG. 5 and the wavelength dependence of the phase difference in the case of the constitution which sets the specific optical path length difference between the pair of optical waveguides so that the phase difference is generated. As shown in FIG. 6, in the constitution which sets the specific optical path length difference in the pair of optical waveguides so that the phase difference is generated, the phase difference between the traveling lights has large wavelength dependence, so a large gap is caused at the upper limit and the lower limit of the used wavelength bandwidth. In contrast, the wavelength dependence of the phase difference between the output lights of 2 inputs and 2 outputs 3 dB multimode interferometer splitter is very small over the whole wavelength bandwidth which is used.

Further, in the configuration mentioned above, a Y branch structure type optical branching device is employed as the optical branching device 3. However, in case that all of the optical path lengths of the optical waveguides 1, 2, 4 and 5 are tried to be equal for the reason that the phase error shall be suppressed as possible, the design for optical path length adjustment becomes easy, if using the multimode interferometer splitter shown in FIG. 3 as the optical branching device 3.

And as the optical branching device 6, it is possible to employ the one whose shape is obtained by eliminating the optical input part on the side that does not perform the optical input in the 2 inputs and 2 outputs 3 dB multimode interferometer splitter shown in FIG. 2, and whose structure has 1 input and 2 outputs that performs the optical input from the position shifting to the edge sides rather than the optical propagation center.

By composing a coherent mixer with the optical waveguide device of this embodiment, the arrangement of the output ports for the four value phase information on the I-Q plane can be coincided with the specification of the order of arrangement of the output port for the output signal of a coherent receiver specified by OIF.

And this optical waveguide device makes the design and production easy since it is not needed to lengthen the specific waveguide by the optical path difference. Further, because the size of the interferometer can be reduced, influence of the phase error caused by production dispersion of the waveguide which composes the interferometer can be made smaller.

Third Embodiment

Figure 7:
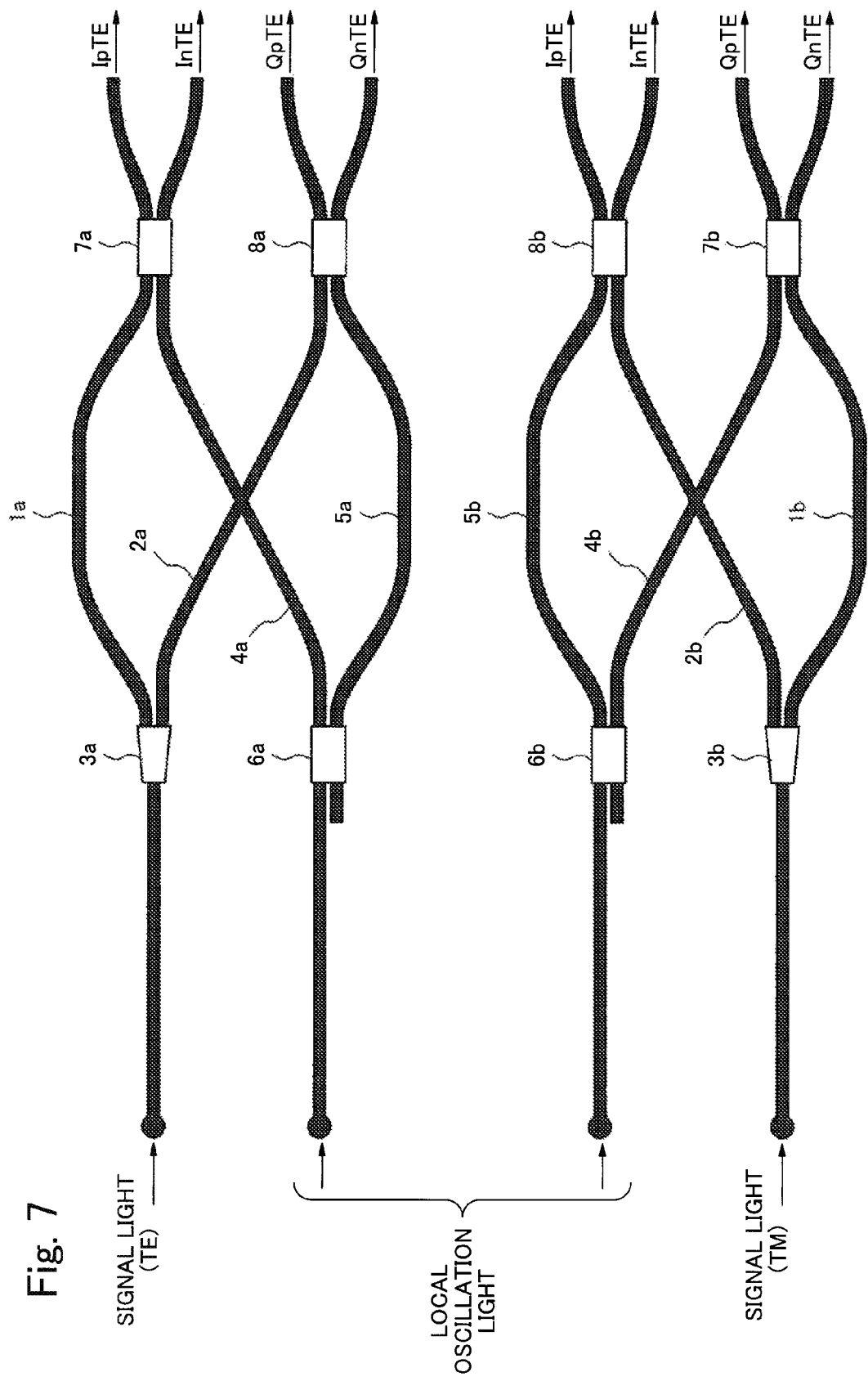
[FIG. 7] is a schematic diagram which shows a structure of a 90 degree optical hybrid interferometer of a third embodiment of the present invention.
Figure 8:
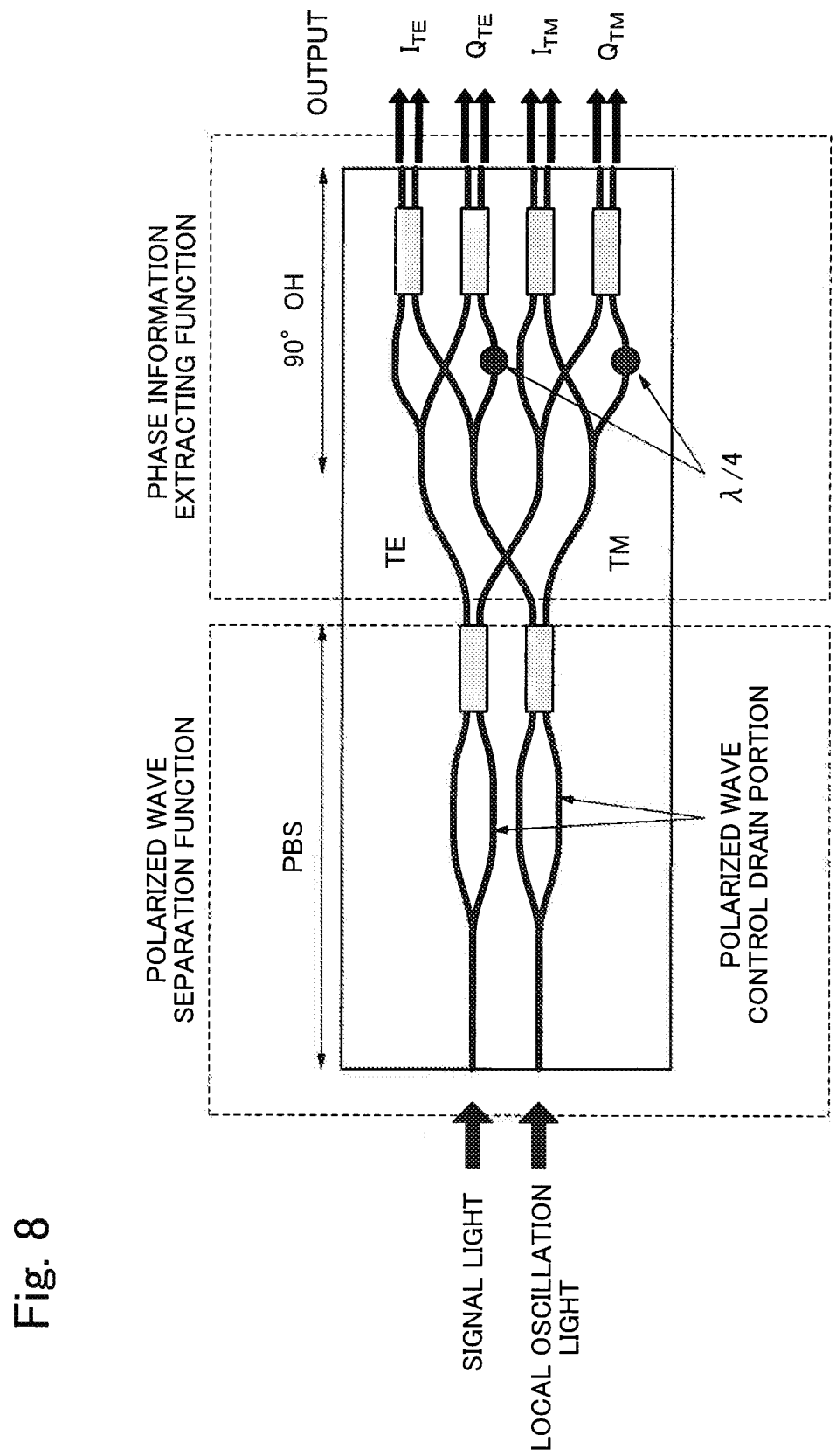
[FIG. 8] is a schematic diagram which shows a structure of a general 90 degree optical hybrid interferometer.
Figure 9:
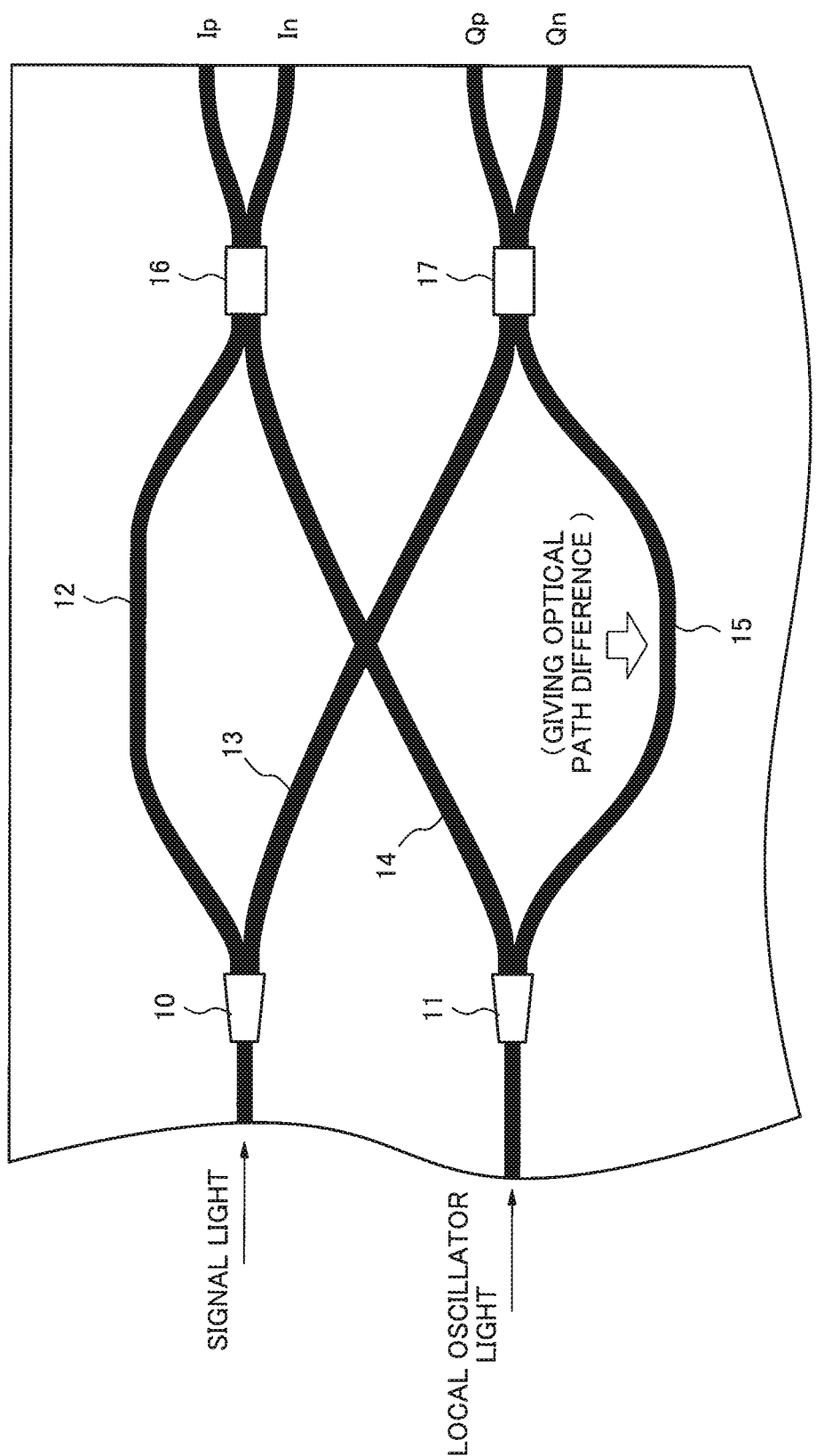
[FIG. 9] is a schematic diagram which shows a structure of a general coherent mixer.

Next, a third embodiment of the present invention is described. FIG. 7 is a schematic diagram which shows an optical waveguide structure of a 90 degree optical hybrid interferometer composed by arranging two coherent mixers of the second embodiment in parallel.

However, in FIG. 7, as against the upper side coherent mixer, the lower side coherent mixer has the reversed positional relation between the input port of the optical signal and the local oscillator light. Accordingly, the lower side coherent mixer exchanges the positions of the input optical branching devices, uses a Y branch structure type optical branching device as the optical branching device 3b, and uses a 2 inputs and 2 outputs 3 dB multimode interferometer splitter as the optical branching device 6b. In addition, the input side of the input light to the optical branching device 6b is also exchanges. Thus, by composing the lower side coherent mixer as the above, the above-mentioned arrangement relation of the phase differences of the first to the fourth output lights can be the same as the upper side coherent mixer.

By composing a 90 degree optical hybrid interferometer as shown in FIG. 7, polarized waves of Transverse Electric (TE) optical signal and Transverse Magnetic (TM) optical signal which are separated, are inputted, and the four-value-phase-information on the I-Q plane Ip, In, Qp and Qn are obtained.

By the above-mentioned configuration, as shown in FIG. 7, the order of arrangement of four ports which input the signal lights and the local oscillator lights, and eight ports which output the output signals follows the receiver specification of the DP-QPSK system decided by OIF.

Further, because two input ports in the part at which local oscillator light is inputted are adjacent to each other, a simple optical waveguide layout, in which the local oscillator lights of the same optical source are branched and inputted to both ports without crossing other optical waveguide arms, can be employed.

In this embodiment as mentioned above, the wavelength dependence of the phase difference, which is given to the lightwave traveling through each optical waveguide arm which composes each coherent mixer, can be reduced, and a 90 degree optical hybrid interferometer of high manufacturing yield can be obtained. In addition, by the optical circuit structure in which crossing portions between the optical waveguide arms are reduced, a 90 degree optical hybrid interferometer which realizes the input/output port arrangement of the OIF standard can be obtained.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-284281, filed on Dec. 21, 2010, the disclosure of which is incorporated herein in its entirety by reference.

REFERENCE SIGNS LIST

1 Optical waveguide.
2 Optical waveguide.
3 Optical branching device.
4 Optical waveguide.
5 Optical waveguide.
6 Optical branching device.
7 Optical coupler.
8 Optical coupler.
10 Optical branching device.
11 Optical branching device.
12 Optical waveguide arm.
13 Optical waveguide arm.
14 Optical waveguide arm.

15 Optical waveguide arm.
16 Optical coupler.
17 Optical coupler.

The invention claimed is:
1. An optical waveguide device comprising:
a first optical branching device that branches a first input light and outputs to a first and a second optical waveguides,
a second optical branching device that branches a second input light and outputs to a third and a fourth optical waveguides,
a first optical coupler that mixes lightwaves which travels through said first and third optical waveguides, and then branches and outputs a first and a second output lights,
a second optical coupler that mixes the lightwave which travels through said second and fourth optical waveguides, and then branches and outputs third and fourth output lights,
wherein optical path lengths are mutually equal between said first and second optical waveguides, and between said third and fourth optical waveguides,
said first optical branching device has the structure in which an optical input from the position that overlaps with the optical propagation center of the device is performed,
said second optical branching device includes a 3 dB multimode interferometer splitter equipped with the structure that the optical input from the position of the edge side rather than the optical propagation center of the device is performed,
as against the output intensity variation characteristic of said first output light, when a phase difference of lightwave which travels through said first optical waveguide from a lightwave which travels through said third optical waveguide is changed,
the output intensity variation characteristic of said second output light, when a phase difference of lightwave which travels through said first optical waveguide from a lightwave which travels through said third optical waveguide is changed,
the output intensity variation characteristic of said third output light, when a phase difference of lightwave which travels through said second optical waveguide from a lightwave which travels through said fourth optical waveguide is changed, and
the output intensity variation characteristic of said fourth output light, when a phase difference of lightwave which travels through said second optical waveguide from a lightwave which travels through said fourth optical waveguide is changed,
are shifted as much as the phase differences of $\pi$, $\pi/2$ and $3\pi/2$, respectively.

2. The optical waveguide device according to claim 1, wherein said first optical branch device comprises a Y branching structure type optical branching device.

3. The optical waveguide device according to claim 1, wherein the optical path lengths of said first to said fourth optical waveguides are equal.

4. An optical waveguide device comprising the constitution in which two optical waveguide devices described in claim 1 are arranged in parallel on the same chip so that all the respective optical input portions and optical output portions are arranged in turn.

* * * * *